United States Patent
Lu et al.

(10) Patent No.: US 11,168,380 B2
(45) Date of Patent: Nov. 9, 2021

(54) METHOD OF STRUCTURAL COLD WORKING-RESIDUAL COMPRESSIVE STRESS DISTRIBUTION QUANTITATIVE MATCHING DESIGN

(71) Applicant: UNIVERSITY OF SHANGHAI FOR SCIENCE AND TECHNOLOGY, Shanghai (CN)

(72) Inventors: Xi Lu, Shanghai (CN); Hanguang Liu, Shanghai (CN); Lei Tian, Shanghai (CN); Hong Wang, Shanghai (CN); Jiawei Huang, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 0 days.

(21) Appl. No.: 17/058,644

(22) PCT Filed: Jul. 9, 2020

(86) PCT No.: PCT/CN2020/101070
§ 371 (c)(1),
(2) Date: Nov. 24, 2020

(87) PCT Pub. No.: WO2021/004504
PCT Pub. Date: Jan. 14, 2021

(65) Prior Publication Data
US 2021/0262058 A1 Aug. 26, 2021

(30) Foreign Application Priority Data

Jul. 11, 2019 (CN) .......................... 201910623530.4

(51) Int. Cl.
*G06F 30/20* (2020.01)
*G06F 30/17* (2020.01)
(Continued)

(52) U.S. Cl.
CPC .............. *C21D 11/00* (2013.01); *G06F 30/17* (2020.01); *G06F 30/20* (2020.01); *G06F 2119/14* (2020.01)

(58) Field of Classification Search
CPC ......... C21D 11/00; G06F 30/20; G06F 30/17; G06F 2119/14
(Continued)

(56) References Cited

U.S. PATENT DOCUMENTS 5,057,108 A * 10/1991 Shetty ................. A61F 2/30767
606/53
5,906,896 A * 5/1999 Jackson ............... F16J 15/3496
428/621
(Continued)

FOREIGN PATENT DOCUMENTS

| CN | 108388695 A | 8/2018 |
|----|-------------|--------|
| CN | 110427657 A | 11/2019 |
| WO | 03080877 A1 | 10/2003 |

OTHER PUBLICATIONS

Davis, "Analytical Modeling and Applications of Residual Stresses Induced by Shot Peening", University of Washington, 2012, 197 pages. (Year: 2012).*
(Continued)

*Primary Examiner* — Phallaka Kik
(74) *Attorney, Agent, or Firm* — Zhu Lehnhoff LLP (57) ABSTRACT

To solve the technical problem of the incapacity to perform a quantitative matching design of residual compressive stress in the process of prior structural cold working-residual compressive stress design, the invention provides a method of structural cold working-residual compressive stress distribution quantitative matching design, characterized by treating the fatigue strength of a mechanical structure and parts as a field, and matching a structural stress field and a fatigue strength field organically, to quantitatively match the (Continued)

residual compressive stress in conjunction with characteristics of the cold working process. The method specifically includes determination of the maximum stress amplitude and a gradient distribution thereof at a dangerous position of the structure, determination of an ideal fatigue strength distribution of the dangerous cross-section of the structure, determination of a fatigue strength field according to curves of end quenching tests for material and a requirement for heat treatment, determination of the limit of the residual compressive stress according to characteristics of the structural cold working process, and determination of an actual residual compressive stress distribution of the dangerous cross-section in conjunction with cold working and the fatigue strength distribution.

5 Claims, 5 Drawing Sheets

(51) Int. Cl.
  *C21D 11/00* (2006.01)
  *G06F 119/14* (2020.01)
(58) Field of Classification Search
  USPC ..................................... 703/1, 2, 7; 148/508
  See application file for complete search history.

(56) References Cited

U.S. PATENT DOCUMENTS

| | | | | |
|---|---|---|---|---|
| 7,623,974 | B2* | 11/2009 | Cipra | G01M 5/0025 702/33 |
| 2003/0085257 | A1* | 5/2003 | James | B23K 20/1275 228/112.1 |
| 2005/0039511 | A1* | 2/2005 | Prevey | C21D 7/06 72/53 |
| 2007/0033980 | A1* | 2/2007 | Nishimura | B23P 6/04 72/362 |
| 2007/0157447 | A1* | 7/2007 | Prevey | B23P 6/002 29/402.01 |
| 2010/0061863 | A1* | 3/2010 | Delvaux | B23K 26/0006 416/241 R |
| 2017/0184050 | A1* | 6/2017 | Gurusamy | F02F 11/005 |
| 2019/0072468 | A1* | 3/2019 | Heiss-Chouquet | H01L 51/0097 |

OTHER PUBLICATIONS

Matos et al., "Residual Stress Effect on Fatique Striation Spacing in a Cold-Worked Rivet Hole", Elsevier Ltd, 2004, pp. 139-148. (Year: 2004).*
Pineault et al., "Residual Stress Characterization of Welds Using X-Ray Diffraction Techniques", ACXRI '96, 1996, pp. 97-106. (Year: 1996).*
Prevey et al., "A Design Methodology to Take Credit for Residual Stresses in Fatigue Limited Designs", Residual Stress Effects on Fatigue and Fracture Testing, ASTM, Lancaster, PA, Jan. 2007, pp. 69-84. (Year: 2007).*
Suominen et al., "Residual Stresses in Welded Components Following Post-Weld Treatment Methods", 5th Fatigue Design Conference, 2013, pp. 181-191. (Year: 2013).*
Xi et al., Chinse Patent Document No. CN-110427657A,, published Nov. 8, 2019, front page and abstract,. (Year: 2019).*
International Search Report in PCT/CN2020/101070 issued by ISA, dated Sep. 25, 2020.
Written Opinion of the International Search Report in PCT/CN2020/101070, issued by ISA, dated Sep. 25, 2020.

* cited by examiner

METHOD OF STRUCTURAL COLD WORKING-RESIDUAL COMPRESSIVE STRESS DISTRIBUTION QUANTITATIVE MATCHING DESIGN

TECHNICAL FIELD

The invention relates to the field of structural fatigue strength cold working-residual compressive stress distribution design in mechanical design, and is suitable for cold working-residual compressive stress distribution quantitative matching design of ferrous metals, nonferrous metals and other mechanical structures and parts.

BACKGROUND

According to the prior cold working-residual compressive stress design of a mechanical structure and parts, the residual compressive stress of the mechanical structure and parts are designed, through analogy, experience and other methods, only as per the strength requirements for dangerous cross-sections. Therefore, in the design process of the residual stress distribution of mechanical parts, there is no theoretical and technical basis for the surface residual compressive stress and the maximum residual compressive stress, and the structural cold working-residual compressive stress distribution quantitative matching design cannot be performed. The invention proposes a concept of "strength field", and thus the structural cold working-residual compressive stress distribution quantitative matching design is performed by converting the stress field into the strength field, determining a microstructure fatigue strength distribution of the dangerous cross-section of the structure according to a static strength requirement for the dangerous cross-section of the structure, treating the residual compressive stress as average stress, matching an actual residual compressive stress distribution of the dangerous cross-section of the structure in conjunction with the microstructure fatigue strength distribution and the fatigue design requirement for the dangerous cross-section, such that the final design of the actual fatigue strength distribution of the structure realizes the intersection of the curves showing the actual fatigue strength distribution and the ideal fatigue strength field distribution, whereby the structural cold working-residual compressive stress distribution quantitative matching design is performed.

SUMMARY OF THE INVENTION

The technical problem to be solved by the invention lies in the incapacity to perform a quantitative matching design of residual compressive stress in the process of structural cold working-residual compressive stress design.

In order to solve the technical problem, the technical solution of the invention provides a method of structural cold working-residual compressive stress distribution quantitative matching design, characterized by comprising the steps of:

step 1, determining a dangerous position of a structure to be subjected to cold working-residual compressive stress quantitative matching design under a given maximum fatigue load amplitude, and obtaining a maximum stress amplitude and a gradient distribution of the stress amplitudes at the dangerous cross-section of the structure;

step 2, determining an ideal fatigue strength field distribution of the structure according to a fatigue strength design requirement, wherein: the ideal fatigue strength distribution requires no strength surplus at any point and demand for strength is met; according to a stress-strength interference theory, an ideal strength at any point of the dangerous cross-section is designed as the fatigue stress amplitude at the point multiplied by a safety coefficient;

step 3, targeting the ideal fatigue strength distribution of the dangerous cross-section, matching material of the structure with heat treatment, performing a microstructural fatigue strength distribution design of the dangerous cross-section by using a hardness-tensile strength-fatigue strength conversion in conjunction with a minimum hardness distribution curve and a maximum hardness distribution curve of end quenching tests for the material, under the condition of satisfying the static strength distribution of the dangerous cross-section;

step 4, determining a limit of the residual compressive stress according to characteristics of the cold working process of the structure, wherein the residual compressive stress has a great influence on the fatigue strength of a surface of the structure, especially a stress concentration portion, the maximum residual compressive stress generated by cold working is found on a subsurface, and the residual compressive stress decreases sharply with the increase of depth; and step 5, determining an actual residual compressive stress distribution of the dangerous cross-section of the structure in conjunction with the cold working and the microstructural fatigue strength distribution, wherein the actual residual compressive stress distribution of the dangerous cross-section of the structure comprises surface residual compressive stress, the maximum residual compressive stress, and the residual compressive stress distribution along the depth.

Preferably, in step 4, the residual compressive stress generated from cold working is effective to fatigue strength within a depth of 0.2 mm, with a peak within 0.1 mm.

Preferably, in step 4, the cold working comprises rolling, sand blasting, shot peening.

Preferably, in step 4, the maximum residual compressive stress of the rolling and the sand blasting reaches 300-500 MPa; the maximum residual compressive stress of the shot peening reaches beyond 1000 MPa.

Preferably, step 5 comprises the steps of:

treating the residual compressive stress as average stress, matching the actual residual compressive stress distribution of the dangerous cross-section of the structure according to the microstructural fatigue strength distribution of the dangerous cross-section and the fatigue design requirement, and enabling the final design of the actual fatigue strength distribution of the structure to realize the intersection of or internal tangent of the curves showing the actual fatigue strength distribution and the ideal fatigue strength field distribution, wherein fatigue cracks are initiated on the subsurface when the intersection happens on the subsurface, and fatigue cracks are initiated on the surface when the intersection happens on the surface; controlling positions where the fatigue cracks are initiated for the structure by controlling the residual compressive stress in conjunction with a curve of end quenching tests of the material and a heat treatment distribution.

Compared with a conventional method of hardness distribution matching design, local residual stress matching can be actively performed through a cold working process and the like, to perform quantitative matching design for the residual stress.

DETAILED DESCRIPTION OF THE PREFERRED EMBODIMENTS

The invention will be further described with reference to the drawings. It should be understood that the embodiments are merely illustrative of the invention and are not intended to limit the scope of the invention. In addition, it will be understood that various changes and modifications may be made by those skilled in the art in light of the teachings of this invention, and these equivalents shall fall within the scope of the appended claims.

Figure 1:
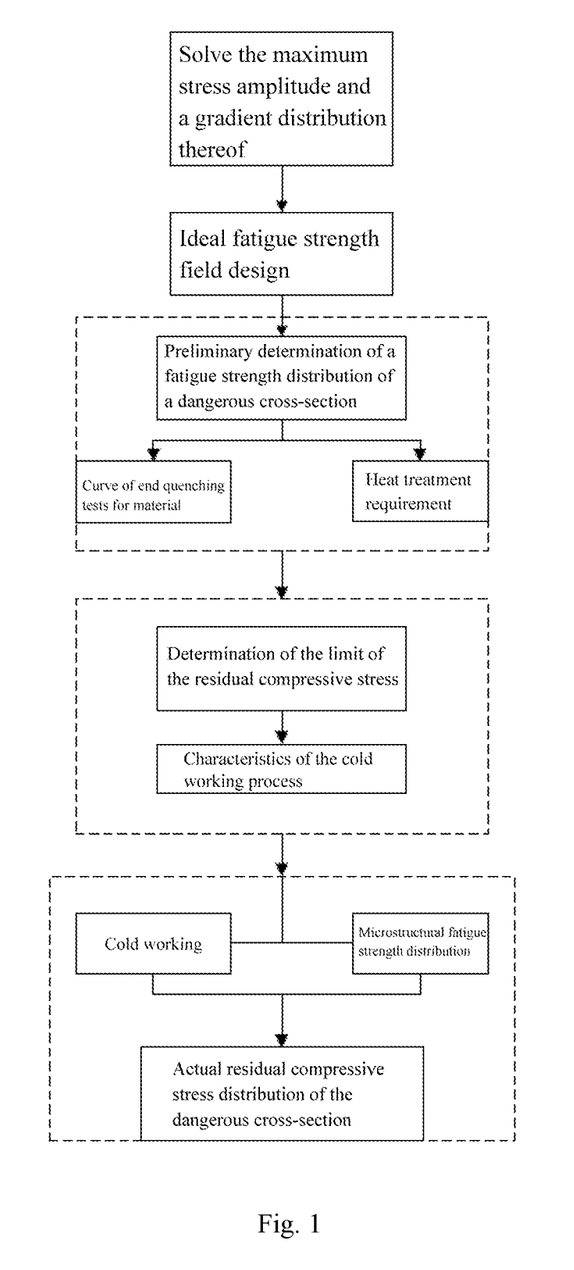
FIG. 1 is a flow chart of an implementation of the present invention.

The invention is further illustrated by taking a single-tooth bending infinite fatigue strength design of a straight toothed spur gear as an example, wherein the material is 16MnCr5 steel, subjected to the heat treatment (i.e., carburizing and quenching), having a surface hardness of 59-63 HRC, a core hardness of 36-47 HRC, a hardened layer at a depth of more than 0.70 mm. The surface of the gear is subjected to forced shot-peening, the maximum residual compressive stress is not less than 1000 MPa, and it's required the single-tooth bending fatigue strength be such designed that cracks are initiated on a subsurface. As shown in FIG. 1, the invention provides a method of structural cold working-residual compressive stress distribution quantitative matching design, including the following steps.

1) Determination of the Maximum Stress Amplitude and a Gradient Distribution Thereof at a Dangerous Position of the Structure Given the maximum fatigue load amplitude, the maximum stress amplitudes at the dangerous position and of the dangerous cross-section of the structure, as well as the gradient distribution of the stress amplitude are determined through material mechanics or finite element calculations.

Figure 2:
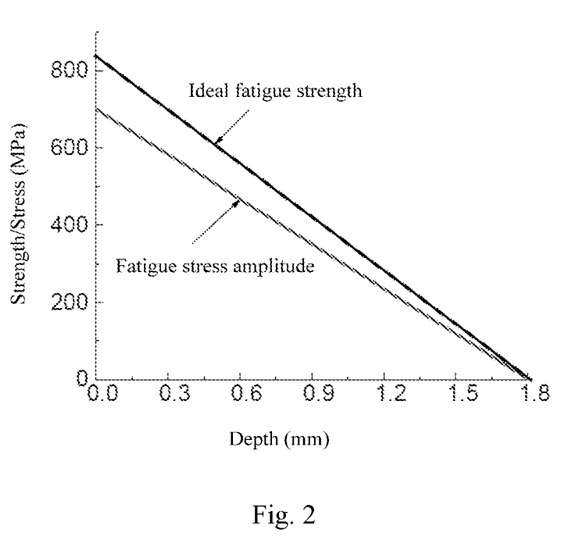
FIG. 2 shows a fatigue tensile stress amplitude distribution and an ideal fatigue strength distribution.

For the single-tooth bending of the straight toothed spur gear, the finite element analysis is applied to arrive at the conclusion the dangerous position of the single-tooth bending is at a cross-section of a root of the gear when the given fatigue load amplitude is 6 kN, and the maximum stress is initiated on the surface of the tooth root, being 705 MP. The gradient of the maximum stress amplitude is from the tooth root to a neutral layer along a direction of the load, and a fatigue tensile stress amplitude distribution of the dangerous position is shown in FIG. 2.

2) Determination of an Ideal Fatigue Strength Distribution of the Dangerous Cross-Section of the Structure According to a Design Requirement for Fatigue Strength The ideal fatigue strength distribution of the requires no strength surplus at any point and demand for strength is met, a ratio of the ideal strength at any point of the dangerous cross-section of the structure to the fatigue stress amplitude of the point is a constant, the ideal fatigue strength field distribution of the structure can be determined according to the design requirement for fatigue strength. The strength is greater than the stress as per the stress-strength interference theory, the ratio of the ideal fatigue strength at any point of the dangerous cross-section of the structure to the fatigue stress amplitude at that point is a constant greater than 1, which is a safety coefficient. The ideal fatigue strength distribution of the dangerous cross-section of the structure has no strength surplus, and the strength utilization rate reaches the maximum.

In the embodiment, as required by the single-tooth bending infinite fatigue strength design of the straight toothed spur gear, the ideal fatigue strength is designed such that the ideal fatigue strength at any point of the dangerous cross-section of the structure is greater than the maximum stress amplitude at that point, the ratio of the ideal fatigue strength to the maximum stress amplitude is a constant, which is the safety coefficient related to factors such as discrete loads and material properties. Assigning 1.2 to the safety coefficient in the embodiment, and the ideal fatigue strength distribution of the dangerous cross-section along the depth is shown in FIG. 2.

3) Determination of a Microstructural Fatigue Strength Distribution of a Dangerous Cross-Section According to a Static Strength Requirement for a Dangerous Cross-Section The ideal fatigue strength distribution of the dangerous cross-section is targeted, the material of the structure is matched with heat treatment, design of the microstructural fatigue strength distribution of the dangerous cross-section is performed by using a hardness-tensile strength-fatigue strength conversion in conjunction with minimum and maximum hardness distribution curves of end quenching tests for the material, under the condition of satisfying the static strength distribution of the dangerous cross-section, so that the designed microstructural fatigue strength distribution and the ideal fatigue strength distribution intersect on the surface or are tangent to each other inside, thereby avoiding a large area of structural fatigue strength surplus on the surface, the subsurface or in a core of the structure.

In the embodiment, the static strength dangerous cross-section and the fatigue strength dangerous cross-section require the same a minimum surface hardness of 59 HRC corresponding to static fracture stress of 2600 MPa. The 16MnCr5 steel can be subjected to carburizing and quenching treatment, with a surface hardness of 59-63 HRC, a core hardness of 36-47 HRC, and a hardened layer at a depth of more than 0.70 mm, which can meet the static strength requirement. The curve showing the fatigue strength distribution along the depth of the dangerous cross-section determined by the single-tooth bending microstructure of the embodiment can be obtained according to the curve of end quenching tests for the 16MnCr5 steel and by using the corresponding relationship among hardness, tensile strength, and fatigue strength. For the embodiment, the hardness-tensile strength-fatigue strength conversion is shown in Equation (1):

$$\sigma_{-1d}=0.3\sigma_b=0.3\times(0.0136H_d^{2.88}+698) \qquad (1)$$

In Equation (1), $\sigma_{-1d}$ is a symmetrical cyclic fatigue strength at depth d in the dangerous cross-section (MPa); $\sigma_b$ is a tensile strength of the material (MPa); $H_d$ is a HRC hardness at depth d in the dangerous cross-section.

Figure 3:
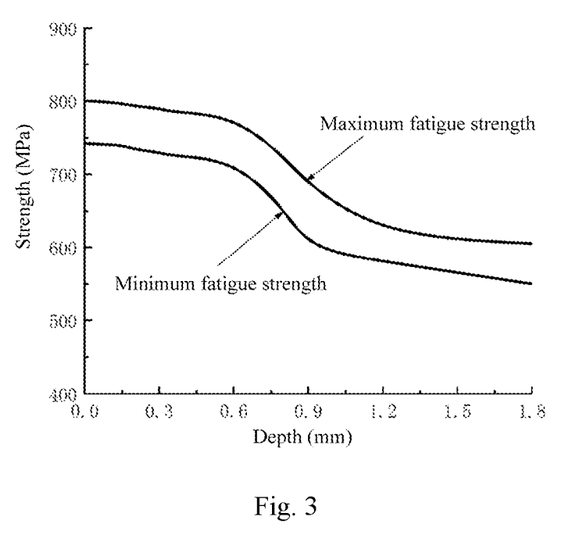
FIG. 3 shows a structural fatigue strength distribution of a dangerous cross-section of a structure.

Using Equation (1), the minimum and maximum curves of the fatigue strength determined by the single-tooth bending microstructure in the embodiment can be obtained, as shown in FIG. 3.

4) Determination of the Limit of the Residual Compressive Stress According to Characteristics of the Structural Cold Working Process the residual compressive stress has a great influence on the fatigue strength of a surface of the structure, especially a stress concentration portion, the cold working includes rolling, sand blasting, shot peening and the like, the maximum residual compressive stress generated by cold working is generally found on the subsurface, and the residual compressive stress decreases sharply with the increase of depth. Therefore, the residual compressive stress generated from cold working is effective to fatigue strength generally within a depth of 0.2 mm, with a peak within 0.1 mm. In the cases of the rolling and the sand blasting in cold working, the maximum residual compressive stress can reach 300-500 MPa, and the fatigue strength and fatigue life are improved to an extent; the shot peening can generate residual compressive stress of up to 1000 MPa or more, and such high residual compressive stress can improve the bending fatigue strength by 300 MPa or more, featuring significant increases in the fatigue strength and the fatigue life.

For the embodiment, the microstructural fatigue strength of the structure on the surface is 740 MPa, and the ideal fatigue strength is 846 MPa, requiring significant improvement to the surface fatigue strength, and that the fatigue cracks be initiated on the subsurface. Therefore, shot peening is adopted, and a peak value of the residual compressive stress determined by the shot peening process should be more than 1000 MPa.

5) Determination of an Actual Residual Compressive Stress Distribution of the Dangerous Cross-Section in Conjunction with Cold Working and the Fatigue Strength Distribution The actual residual compressive stress distribution of the dangerous cross-section of the structure includes surface residual compressive stress, the maximum residual compressive stress, and the residual compressive stress distribution along the depth. The residual compressive stress is treated as average stress, the actual residual compressive stress distribution of the dangerous cross-section of the structure is matched according to the microstructural fatigue strength distribution of the dangerous cross-section and the fatigue design requirement, and the final design of the actual fatigue strength distribution of the structure is enabled to realize the intersection of the curves showing the actual fatigue strength distribution and the ideal fatigue strength field distribution, wherein fatigue cracks are initiated on the subsurface when the intersection happens on the subsurface, and fatigue cracks are initiated on the surface when the intersection happens on the surface; positions, where the fatigue cracks are initiated for the structure, can be controlled by controlling the residual compressive stress in conjunction with a curve of end quenching tests of the material and a heat treatment distribution.

The influence of the residual compressive stress as average stress on the fatigue strength can be processed according to Goodman Equation:

$$\sigma_{sd} = \left(1 - \frac{\sigma'_{-1d}}{\sigma_{-1d}}\right)\sigma_b \quad (2)$$

In Equation (2): $\sigma'_{-1d}$ is the fatigue strength at depth d in the tooth root with the residual stress considered (MPa); $\sigma_{-1d}$ is the microstructural fatigue strength at depth d in the tooth root (MPa); $\sigma_{sd}$ is the stress distribution at depth d in the tooth root (MPa);

For the gear of the embodiment, the curves showing the actual fatigue strength distribution and the ideal fatigue strength field distribution have to intersect on the subsurface so that the fatigue cracks are initiated on the subsurface. The relationship between the fatigue strength of the dangerous cross-section and the ideal fatigue strength which are matched is shown in FIG. 4 below.

Figure 4:
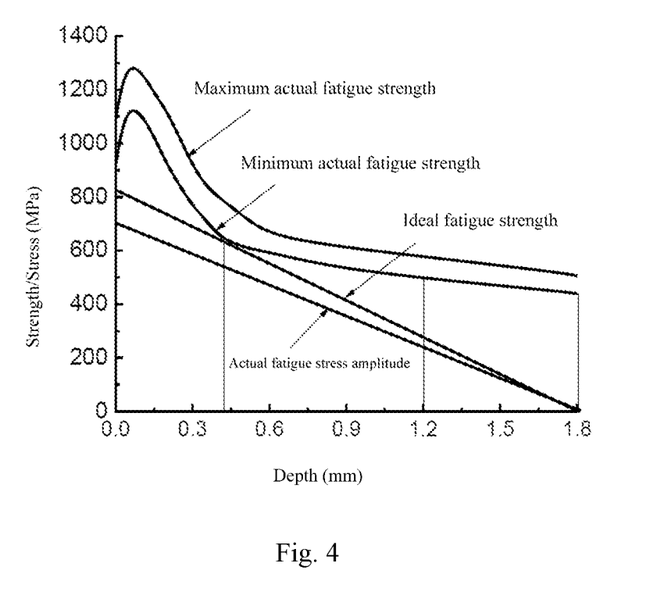
FIG. 4 shows a fatigue strength distribution and an ideal fatigue strength distribution of a dangerous cross-section.

FIG. 4 shows that the ideal fatigue strength distribution and the minimum fatigue strength distribution are in contact near a depth of 0.4 mm into the subsurface, this depth is the dangerous position of fatigue, where fatigue cracks are initiated, and the fatigue strength distribution design of the dangerous cross-section can meet the design requirement. At this time, the fatigue strength of the surface within a depth of 0.2 mm is improved by the residual compressive stress, the fatigue strength on the surface has at least to be more than 900 MPa, and the minimum residual compressive stress on the surface in the embodiment can be obtained to be 700 MPa according to Equation (2).

Figure 5:
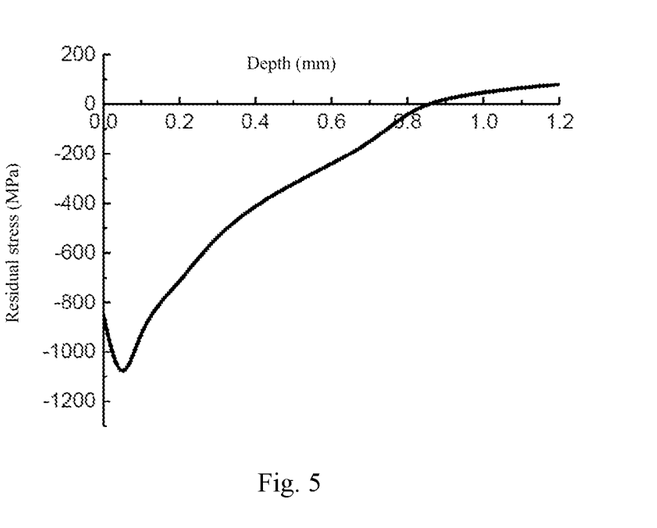
FIG. 5 shows a matched residual compressive stress distribution.

The calculated minimum residual compressive stress on the surface is 700 MPa. Considering the dispersion of residual compressive stress and the shot peening process itself, the matched residual compressive stress on the surface in the embodiment is above 800 MPa, the maximum residual compressive stress can reach 1100 MPa, the maximum residual compressive stress is at a depth of about 0.05 mm into the subsurface, and the residual compressive stress drops sharply beyond a depth of 0.2 mm, and has no effect on the improvement of fatigue strength. The matched residual compressive stress distribution of the dangerous cross-section is shown in FIG. 5.

The invention claimed is:

1. A method of structural cold working-residual compressive stress distribution quantitative matching design, characterized by comprising the steps of:
    step 1, determining a dangerous position of a structure to be subjected to cold working-residual compressive stress quantitative matching design under a given maximum fatigue load amplitude, and obtaining a maximum stress amplitude and a gradient distribution of the stress amplitudes at the dangerous cross-section of the structure;
    step 2, determining an ideal fatigue strength field distribution of the structure according to a fatigue strength design requirement, wherein: the ideal fatigue strength distribution requires no strength surplus at any point and demand for strength is met; according to a stress-strength interference theory, an ideal strength at any point of the dangerous cross-section is designed as the fatigue stress amplitude at the point multiplied by a safety coefficient;
    step 3, targeting the ideal fatigue strength distribution of the dangerous cross-section, matching material of the structure with heat treatment, performing a microstructural fatigue strength distribution design of the dangerous cross-section by using a hardness-tensile strength-fatigue strength conversion in conjunction with a minimum hardness distribution curve and a maximum hardness distribution curve of end quenching tests for the material, under the condition of satisfying the static strength distribution of the dangerous cross-section;
    step 4, determining a limit of the residual compressive stress according to characteristics of the cold working process of the structure, wherein the residual compressive stress has a great influence on the fatigue strength of a surface of the structure, especially a stress concentration portion, the maximum residual compressive stress generated by cold working is found on a subsurface, and the residual compressive stress decreases sharply with the increase of depth; and
    step 5, determining an actual residual compressive stress distribution of the dangerous cross-section of the structure in conjunction with the cold working and the microstructural fatigue strength distribution, wherein the actual residual compressive stress distribution of the dangerous cross-section of the structure comprises surface residual compressive stress, the maximum residual compressive stress, and the residual compressive stress distribution along the depth.

2. The method of structural cold working-residual compressive stress distribution quantitative matching design according to claim 1, characterized in that in step 4, the residual compressive stress generated from cold working is effective to fatigue strength within a depth of 0.2 mm, with a peak within 0.1 mm.

3. The method of structural cold working-residual compressive stress distribution quantitative matching design according to claim 1, characterized in that in step 4, the cold working comprises rolling, sand blasting, shot peening.

4. The method of structural cold working-residual compressive stress distribution quantitative matching design according to claim 3, characterized in that in step 4, the maximum residual compressive stress of the rolling and the sand blasting reaches 300-500 MPa; the maximum residual compressive stress of the shot peening reaches beyond 1000 MPa.

5. The method of structural cold working-residual compressive stress distribution quantitative matching design according to claim 1, characterized in that step 5 comprises the steps of:

treating the residual compressive stress as average stress, matching the actual residual compressive stress distribution of the dangerous cross-section of the structure according to the microstructural fatigue strength distribution of the dangerous cross-section and the fatigue design requirement, and enabling the final design of the actual fatigue strength distribution of the structure to realize the intersection of the curves showing the actual fatigue strength distribution and the ideal fatigue strength field distribution, wherein fatigue cracks are initiated on the subsurface when the intersection happens on the subsurface, and fatigue cracks are initiated on the surface when the intersection happens on the surface; controlling positions where the fatigue cracks are initiated for the structure by controlling the residual compressive stress in conjunction with a curve of end quenching tests of the material and a heat treatment distribution.

\* \* \* \* \*